US009400958B2

(12) United States Patent
B'Far et al.

(10) Patent No.: US 9,400,958 B2
(45) Date of Patent: Jul. 26, 2016

(54) TECHNIQUES FOR DISPLAY OF INFORMATION RELATED TO POLICIES

(75) Inventors: Reza B'Far, Huntington Beach, CA (US); Lloyd Boucher, Santa Ana, CA (US); Yasin Cengiz, Santa Ana, CA (US); Tsai-Ming Tseng, Santa Ana, CA (US); Logan Goh, Irvine, CA (US); Malini Chakrabarti, Cliffside Park, NJ (US); Huyvu Nguyen, Orange, CA (US); Timothy Jason Bass, Colorado Springs, CO (US); Minh Le, Irvine, CA (US); Rafael Paxi, South Windsor, CT (US); Neeharika Adavikolanu, Middletown, CT (US); Elizabeth Lingg, Brooklyn, NY (US)

(73) Assignee: Oracle International Corporation, Redwood Shores, CA (US)

( * ) Notice: Subject to any disclaimer, the term of this patent is extended or adjusted under 35 U.S.C. 154(b) by 497 days.

(21) Appl. No.: 12/827,068

(22) Filed: Jun. 30, 2010

(65) Prior Publication Data

US 2012/0005631 A1    Jan. 5, 2012

(51) Int. Cl.
*G06F 3/0485*    (2013.01)
*G06F 17/00*    (2006.01)
*G06Q 10/00*    (2012.01)

(52) U.S. Cl.
CPC ...................................... *G06Q 10/00* (2013.01)

(58) Field of Classification Search
CPC ................................................... G06F 9/5038
USPC ........... 715/854; 705/7.11, 7.12, 301; 716/52, 716/102; 706/47
See application file for complete search history.

(56) References Cited

U.S. PATENT DOCUMENTS

| | | | |
|---|---|---|---|
| 5,630,025 A | 5/1997 | Dolby et al. | |
| 5,983,272 A | 11/1999 | Rosen et al. | |
| 6,029,144 A * | 2/2000 | Barrett et al. | 705/30 |
| 6,076,083 A * | 6/2000 | Baker | 706/52 |
| 6,081,657 A * | 6/2000 | Ott | 716/102 |
| 6,381,564 B1 | 4/2002 | Davis et al. | |
| 6,801,883 B1 | 10/2004 | Hurlock | |
| 6,917,840 B2 | 7/2005 | Lund | |
| 6,980,939 B2 | 12/2005 | Dhir et al. | |
| 7,050,863 B2 | 5/2006 | Mehta et al. | |
| 7,092,845 B2 | 8/2006 | Keane et al. | |
| 7,266,847 B2 | 9/2007 | Pauker et al. | |
| 7,340,469 B1 * | 3/2008 | Alghathbar et al. | |
| 7,379,890 B2 | 5/2008 | Myr et al. | |
| 7,467,333 B2 | 12/2008 | Keeton et al. | |

(Continued)

OTHER PUBLICATIONS

Bishop, Christopher M., *Pattern Recognition and Machine Learning*, Springer, New York, NY (2006).

(Continued)

*Primary Examiner* — Jennifer To
*Assistant Examiner* — Jasmine Wan
(74) *Attorney, Agent, or Firm* — Kilpatrick Townsend and Stockton LLP

(57) ABSTRACT

Techniques for displaying information. Policy violations are identified, based at least in part on data stored in a data store. For the policy violations, a plurality of semantic objects related to the violations are identified. Arrangements of graphical objects are displayed where the graphical objects represent the identified semantic objects and where the arrangement indicates one or more relationships between pairs of the semantic objects.

17 Claims, 6 Drawing Sheets

(56) References Cited

U.S. PATENT DOCUMENTS

| | | | |
|---|---|---|---|
| 7,493,630 B2 | 2/2009 | Hunt | |
| 7,539,676 B2 | 5/2009 | Aravamudan | |
| 7,630,877 B2 | 12/2009 | Brown et al. | |
| 7,657,935 B2* | 2/2010 | Stolfo et al. | 726/22 |
| 7,734,564 B2 | 6/2010 | Kaseda et al. | |
| 7,770,151 B2 | 8/2010 | Sanjar et al. | |
| 8,024,682 B2 | 9/2011 | McConaghy et al. | |
| 8,131,677 B2* | 3/2012 | Hsu | 707/626 |
| 8,204,719 B2 | 6/2012 | Diao et al. | |
| 8,307,343 B2 | 11/2012 | Chaudhuri et al. | |
| 8,312,171 B2 | 11/2012 | B'Far et al. | |
| 8,315,960 B2 | 11/2012 | Chen et al. | |
| 8,438,378 B2 | 5/2013 | Lazar | |
| 2003/0088449 A1* | 5/2003 | Menninger | 705/8 |
| 2003/0135354 A1 | 7/2003 | Gabele et al. | |
| 2003/0229478 A1 | 12/2003 | Rappaport et al. | |
| 2004/0068712 A1* | 4/2004 | Heng et al. | 716/21 |
| 2004/0093344 A1 | 5/2004 | Berger et al. | |
| 2004/0210654 A1* | 10/2004 | Hrastar | 709/224 |
| 2005/0007249 A1* | 1/2005 | Eryurek et al. | 340/511 |
| 2005/0038764 A1* | 2/2005 | Minsky et al. | 706/47 |
| 2005/0097449 A1 | 5/2005 | Lumera et al. | |
| 2005/0182657 A1* | 8/2005 | Abraham-Fuchs et al. | 705/2 |
| 2005/0262230 A1 | 11/2005 | Liu et al. | |
| 2006/0025985 A1 | 2/2006 | Vinberg et al. | |
| 2006/0212486 A1 | 9/2006 | Kennis et al. | |
| 2006/0262740 A1 | 11/2006 | Schirmer et al. | |
| 2007/0143338 A1* | 6/2007 | Wang et al. | 707/103 R |
| 2007/0174106 A1* | 7/2007 | Aniszczyk et al. | 705/10 |
| 2007/0192863 A1 | 8/2007 | Kapoor et al. | |
| 2008/0010609 A1 | 1/2008 | Curtis et al. | |
| 2008/0040245 A1* | 2/2008 | Wadawadigi et al. | 705/28 |
| 2008/0109475 A1 | 5/2008 | Burmester et al. | |
| 2008/0147610 A1* | 6/2008 | Mohanty et al. | 707/3 |
| 2008/0256121 A1 | 10/2008 | Liu et al. | |
| 2008/0270303 A1* | 10/2008 | Zhou et al. | 705/44 |
| 2008/0282321 A1* | 11/2008 | Hecht et al. | 726/1 |
| 2008/0306894 A1* | 12/2008 | Rajkumar et al. | 706/47 |
| 2009/0112780 A1 | 4/2009 | Chen et al. | |
| 2009/0183227 A1 | 7/2009 | Isaacs et al. | |
| 2009/0198474 A1 | 8/2009 | Fritz et al. | |
| 2009/0300002 A1* | 12/2009 | Thomas et al. | 707/5 |
| 2009/0307028 A1 | 12/2009 | Eldon et al. | |
| 2009/0319092 A1 | 12/2009 | Piche | |
| 2009/0328222 A1* | 12/2009 | Helman et al. | 726/25 |
| 2010/0070422 A1* | 3/2010 | Kikuchi | G06F 9/5038 705/301 |
| 2010/0174754 A1 | 7/2010 | B'Far et al. | |
| 2010/0218134 A1 | 8/2010 | B'Far et al. | |
| 2010/0250779 A1 | 9/2010 | B'Far et al. | |
| 2011/0099638 A1 | 4/2011 | Jones et al. | |
| 2012/0030202 A1 | 2/2012 | B'Far et al. | |
| 2012/0310618 A1 | 12/2012 | B'Far et al. | |
| 2012/0310870 A1 | 12/2012 | Caves et al. | |
| 2014/0108461 A1 | 4/2014 | B'Far et al. | |

OTHER PUBLICATIONS

Bruns, et al., "A Simple and Expressive Semantic Framework for Policy Composition in Access Control," *ACM SIG on Security, Audit and Control*, 10pp (2007).
Codd, E. F., "A Relational Model of Data for Large Shared Data Banks," *Communications of the ACM*, vol. 13, No. 6, pp. 377-387 (Jun. 1970).
De Luca, Ernesto William and Andreas Nurnberger, "Ontology-Based Semantic Online Classification of Documents: Supporting Users in Searching the Web," *Proc. of the European Symposium on Intelligent Technologies (EUNITE)*, 9pp., (2004).
Fukunaga, Keinosuke, *Statistical Pattern Recognition*, Morgan Kaufmann, San Francisco, CA (1990).
Gray, Jim, "The Transaction Concept: Virtues and Limitations," *Proceedings of the 7th International Conference on Very Large Data Bases*, pp. 144-154, Tandem Computers: Cupertino, CA (Sep. 1983).
Huynh, et al., "The Semantic User Interface Paradigm for Presenting Semi-structured Information," 2pp, MIT Artificial Intelligence Laboratory, Cambridge, MA (2002).
Russell, et al., "NITELIGHT: A Graphical Tool for Sematic Query Construction," in *Semantic Web User Interaction Workshop (SWUI)*, 10pp., Florence, Italy (Apr. 2008).
Stanford Center for Biomedical Informatics Research, "The Protégé Ontology Editor and Knowledge Acquisition System," 1pg. http://protege.stanford.edu/ (accessed Jun. 2010).
Taylor, James with Neil Raden, *Smart (Enough) Systems*, Prentice Hall, Boston, MA (2007).
Weiss, Sholom and Casimir Kulikowski, *Computer Systems That Learn*, Morgan Kaufmann, San Mateo, CA (1991).
Yahoo! Inc., "Pipes: Rewire the Web," 1pg. http://pipes.yahoo.com/pipes/ (accessed Jun. 2010).
Bates et al., "Formulation of the Audze-Eglais Uniform Latin Hypercube Design of Experiments," *Advances in Engineering Software*, vol. 34, 2003, pp. 493-506.
Bates et al., "Formulation of the Optimal Latin Hypercube Design of Experiments Using a Permutation Genetic Algorithm," *Proceedings of the In 45th AIAA/ASME/ASCE/AHS/ASC Structures, Structural Dynamics and Materials Conference*, Apr. 2004.
Chung, I-Hsin and Jeffery Collingsworth, "A Case Study Using Automatic Performance Tuning for Large Scale Scientific Programs," *15th IEEE International Conference on High Performance Distributed Computing*, 2006, pp. 45-56.
Cook, Henry and Kevin Skadron, "Predictive Design Space Exploration Using Genetically Programmed Response Surfaces," *Proceedings of the 45th ACM/IEEE Conference on Design Automation (DAC)*, Jun. 2008.
Goldberg, David, *Genetic Algorithms in Search Optimization and Machine Learning*, 1989, Table of Contents, pp. 41-45, Addison Wesley.
Hassoun, Mohamad H., *Fundamentals of Artificial Neural Networks*, 1995, MIT Press.
Ipek et al., "An Approach to Performance Prediction for Parallel Applications," *EURO-PAR* 2005, pp. 196-205.
Ipek et al., "Efficiently Exploring Architectural Design Spaces via Predictive Modeling," *ASPLOS*, 2006, pp. 195-206.
Kennedy, J. and R. Eberhart, "Particle Swarm Optimization," *Proceedings of IEEE International Conference on Neural Networks*, vol. 4, 1995, pp. 1942-1948.
Li et al., "Accurate and Efficient Processor Performance Prediction via Regression Tree Based Modeling," Journal of Systems Architecture, vol. 55, 2009, pp. 457-467.
Nelder, John and R. Mead, "A Simplex Method for Function Minimization," *The Computer Journal*, vol. 7 (4), 1965, pp. 308-313.
Ozisikyilmaz et al., "Efficient System Design Space Exploration Using Machine Learning Techniques," *Proceedings of the Design Automation Conference (DAC)*, Jun. 2008, pp. 966-969.
Ribler et al., "Autopilot: Adaptive Control of Distributed Application," *Proceedings of the 7th IEEE Symposium on High-Performance Distributed Computing*, Jul. 1998, Chicago, Illinois.
Russel, Stuart and Peter Norvig, *Artificial Intelligence: A Modern Approach*, 2003, Prentice Hall.
Yoo et al., "Constructing a Non-Linear Model with Neural Networks for Workload Characterization," *Proceedings of the 2006 IEEE International Symposium on Workload Characterization*, Oct. 2006, pp. 150-159, San Jose, California.
U.S. Appl. No. 12/684,065, Final Office Action, mailed Feb. 13, 2012; 20 pages.
U.S. Appl. No. 12/684,065, Final Office Action, mailed Apr. 4, 2013; 26 pages.
U.S. Appl. No. 12/684,065, Non-Final Office Action, mailed Oct. 7, 2011; 18 pages.
U.S. Appl. No. 12/684,065, Non-Final Office Action, mailed Oct. 18, 2012; 28 pages.
U.S. Appl. No. 12/714,206, Final Office Action, mailed Apr. 10, 2013; 13 pages.
U.S. Appl. No. 12/714,206, Non-Final Office Action, mailed Dec. 28, 2012; 14 pages.
U.S. Appl. No. 12/749,224, Non-Final Office Action, mailed Nov. 9, 2011; 15 pages.

(56) References Cited

OTHER PUBLICATIONS

U.S. Appl. No. 12/749,224, Notice of Allowance, mailed Jul. 11, 2012; 8 pages.
U.S. Appl. No. 12/846,684, Final Office Action, mailed Mar. 1, 2013; 31 pages.
U.S. Appl. No. 12/846,684, Non-Final Office Action, mailed Aug. 21, 2012; 24 pages.
U.S. Appl. No. 13/149,663, Non-Final Office Action, mailed Feb. 19, 2013; 15 pages.
Dean et al., "MapReduce: Simplified Data Processing on Large Clusters", Proceedings of the 6th Symposium on Operating Systems Design and Implementation (OSDI '04), 2004, pp. 137-149.
U.S. Appl. No. 12/684,065 , "Notice of Allowance", Sep. 11, 2013, 9 pages.
U.S. Appl. No. 12/846,684 , "Non-Final Office Action", Oct. 21, 2013, 25 pages.
U.S. Appl. No. 13/149,663 , "Non Final Office Action", Aug. 19, 2013, 18 pages.
Palmero et al., "ReSPIR: A Response Surface-Based Pareto Iterative Refinement for Application-Specific Design Space v Exploration", IEEE Transactions on Computer-Aided Design of Integrated Circuits and Systems, vol. 28, No. 12, Dec. 2009, pp. 1816-1829.
Yilmaz et al., "Main Effects Screening: A Distributed Continuous Quality Assurance Process for Monitoring Performance Degradation in Evolving Software Systems", ICSE, 2005, 10 pages.
Non-Final Office Action for U.S. Appl. No. 14/107,991 dated Jul. 23, 2015, 15 pages.
U.S. Appl. No. 12/714,206, Non-Final Office Action, mailed Jun. 8, 2015, 13 pages.
U.S. Appl. No. 13/149,663 Final Office Action mailed Jan. 2, 2014, 23 pages.
U.S. Appl. No. 13/149,701 Non-Final Office Action mailed Mar. 11, 2014, 14 pages.
U.S. Appl. No. 12/846,684 Final Office Action mailed Mar. 14, 2014, 35 pages.
Peng et al., "PSO for Solving RCPSP", Chinese Control and Decision Conference, 2008, 5 pages.
Boning et al, "DOE/Opt: A System for Design of Experiments, Response Surface Modeling, And Optimization Using Process and Device Simulation", Texas Instruments Semiconductor Process and Design Center, Dec. 7, 1993.
Duan et al, "Tuning Database Configuration Parameters with iTuned", VLDB, Aug. 24-28, 2009.
Chen et al, "Experience Transfer for the Configuration Tuning in Large-Scale Computing Systems", IEEE Transactions on Knowledge and Data Engineering, vol. 23, No. 3, Mar. 2011.
Koch et al, "Interdigitation for Effective Design Space Exploration Using iSIGHT", Struct. Multidisc. Optim. 23, pp. 111-126, 2002.
Cheng et al, "Latin Hypercube Sampling in Bayesian Networks", FLAIRS-00 Proceedings, 2000.
Simpson et al, "Metamodels for Computer-based Engineering Design: Survey and Recommendations", Engineering with Computers 17, pp. 129-150, 2001.
Thonangi et al, "Finding Good Configurations in High-Dimensional Spaces: Doing More with Less", IEEE International Symposium on Modeling, Analysis and Simulation of Computers and Telecommunication Systems, 2008.
Xi et al, "A Smart Hill-Climbing Algorithm for Application Server Configuration", WWW2004, May 17-22, 2004.
U.S. Appl. No. 12/714,206 Non- Final Office Action mailed on Jun. 19, 2014, 12 pages.
U.S. Appl. No. 13/149,663, Non Final Office Action mailed on May 16, 2014, 31 pages.
U.S. Appl. No. 13/149,701, Notice of Allowance mailed on Jul. 30, 2014 14 pages.
U.S. Appl. No. 14/107,991, Non-Final Office Action mailed on Jun. 2, 2014, 12 pages.
Notice of Allowance for U.S. Appl. No. 13/149,663 mailed on Sep. 30, 2014, 13 pages.
Notice of Allowance for U.S. Appl. No. 12/846,684 mailed on Oct. 7, 2014, 11 pages.
Final Office Action for U.S. Appl. No. 12/714,206 mailed on Dec. 3, 2014, 12 pages.
Final Office Action for U.S. Appl. No. 14/107,991 mailed on Jan. 21, 2015 12 pages.

* cited by examiner

TECHNIQUES FOR DISPLAY OF INFORMATION RELATED TO POLICIES

CROSS-REFERENCES TO RELATED APPLICATIONS

The present application also incorporates by reference the full disclosure of U.S. application Ser. No. 12/714,206, with the title of "Techniques for Semantic Business Policy Composition."

BACKGROUND OF THE INVENTION

Businesses and other organizations may engage in many transactions during the course of operations. As a result, there are numerous opportunities for fraud and mistakes to happen that can impact organizations, both financially and otherwise. For example, a single invoice may be paid twice, or at least appear to be paid twice in data records, due to one or more employees engaging in a scheme to embezzle funds, due to a data entry error, or due to other reasons. Regardless of the reasons, fraud and mistakes can have serious consequences. Accordingly, organizations may spend significant effort attempting to detect fraud and mistakes. Such efforts may include monitoring various computing systems utilized by an organization in order to use automated processes to detect potential fraud and mistakes.

Detection of fraud and mistakes, however, can be a rather complex undertaking. Often organizations use different computing systems for different purposes, such as for customer relationship management (CRM), human resources (HR), electronic mail and other communication, and the like. Fraud or mistakes may implement multiple systems and often information represented in one system may be represented in another system in a completely different manner. Further, information may be stored in a manner that provides efficient data access and/or processing, but that is not intuitive. In addition, as organizations become better at detecting fraud and as technology develops, perpetrators of fraud adapt both to avoid detection and to take advantage of opportunities provided by new technologies. Consequently, effective detection of fraud and mistakes may require intimate knowledge of an organization's systems, both in how each system uses and stores information and in how the systems relate to one another, and an ability to quickly adapt quickly. Because of the sophisticated nature of organizations' systems, forensic investigation of potential fraud or mistakes can be rather difficult.

BRIEF SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

In an embodiment, a computer-implemented method of displaying information is disclosed. A policy violation is identified based at least in part on data stored in a data store. A plurality of semantic objects related to the policy violation are identified and an arrangement of graphical representations of the semantic objects is caused to be displayed, where the arrangement indicates one or more relationships between one or more pairs of the semantic objects.

The arrangement may include a graph comprising a plurality of nodes and one or more edges connecting at least a subset of the nodes, and each of the plurality of nodes may to at least one of the semantic objects. At least one of the one or more edges between a particular pair of nodes may indicate a direction between the particular pair of nodes, and the direction may indicate a characteristic of a relationship between semantic objects corresponding to the particular pair.

In an embodiment, the method includes for one or more of the semantic objects, identifying one or more workflows related to the one or more semantic objects and causing the display of a workflow representation with the arrangement. The method may also include assigning attributes to one or more of the semantic objects, and wherein one or more of the graphical representations have one or more visual characteristics corresponding to one or more of the assigned attributes. At least one of the graphical representations, in an embodiment, represents a set of the semantic objects, and the method may include receiving selection of said at least one graphical representations and causing display of second graphical representations of the set of graphical representations in a second arrangement indicative of one or more second relationships between one or more pairs of the set of semantic objects. At least a portion of the arrangement may represent a Baysian network.

In an another embodiment, a computer-readable storage medium having stored thereon instructions that cause one or more processors to display information is disclosed. The instructions, in an embodiment, include instructions that cause the one or more processors to identify, based at least in part on data stored in a data store, a policy violation; instructions that cause the one or more processors to identify a plurality of semantic objects related to the policy violation; and instructions that cause the one or more processors to cause display of graphical representations of the semantic objects in an arrangement indicative of one or more relationships between one or more pairs of the semantic objects.

In an embodiment, the arrangement includes a graph comprising a plurality of nodes and one or more edges connecting at least a subset of the nodes. Each of the plurality of nodes may correspond to at least one of the semantic objects. At least one of the one or more edges between a particular pair of nodes, in an embodiment, indicates a direction between a pair of the nodes, the direction indicating a characteristic of a relationship between semantic objects corresponding to the pair.

In an embodiment, the computer-readable storage medium includes instructions that cause the one or more processors to, for one or more of the semantic objects, identify one or more workflows related to the one or more semantic objects; and instructions that cause the one or more processors to cause the display of a workflow representation with the arrangement. Instructions that cause the one or more processors to assign attributes to one or more of the semantic objects, and wherein one or more of the graphical representations have one or more visual characteristics corresponding to one or more of the assigned attributes may also be included.

In an embodiment, at least one of the graphical representations represents a set of the semantic objects, and the instructions further comprise instructions that cause the one or more processors to receive selection of said at least one graphical representations; and instructions that cause the one or more processors to cause display of second graphical representations of the set of graphical representations in a second arrangement indicative of one or more second relationships between one or more pairs of the set of semantic objects. At least a portion of the arrangement may represent a Baysian network.

In yet another embodiment, a system for causing display of information is disclosed. The system may include at least one data store for storing data and one or more processors at least operable to determine, based at least in part on the data, a policy violation, identify a plurality of semantic objects related to the policy violation, and cause display of graphical representations of the semantic objects in an arrangement indicative of one or more relationships between one or more pairs of the semantic objects.

In an embodiment, the arrangement includes a graph comprising a plurality of nodes and one or more edges connecting at least a subset of the nodes. Each of the plurality of nodes corresponds to at least one of the semantic objects. At least one of the one or more edges between a particular pair of nodes may indicate a direction between the pair of the nodes, the direction indicating a characteristic of a relationship between semantic objects corresponding to the particular pair. In an embodiment, the one or more processors are further operable to, for one or more of the semantic objects, identify one or more workflows related to the one or more semantic objects and to cause the display of a workflow representation with the arrangement. The one or more processors may be further operable to cause the one or more processors to assign attributes to one or more of the semantic objects. One or more of the graphical representations may have one or more visual characteristics corresponding to one or more of the assigned attributes.

In an embodiment, at least one of the graphical representations represents a set of the semantic objects, and the one or more processors are further operable to receive selection of said at least one graphical representations and cause display of second graphical representations of the set of graphical representations in a second arrangement indicative of one or more second relationships between one or more pairs of the set of semantic objects. At least a portion of the arrangement represents a Baysian network.

For a fuller understanding of the nature and advantages of the present invention, reference should be made to the ensuing detailed description and accompanying drawings.

DETAILED DESCRIPTION OF THE INVENTION

Figure 1:
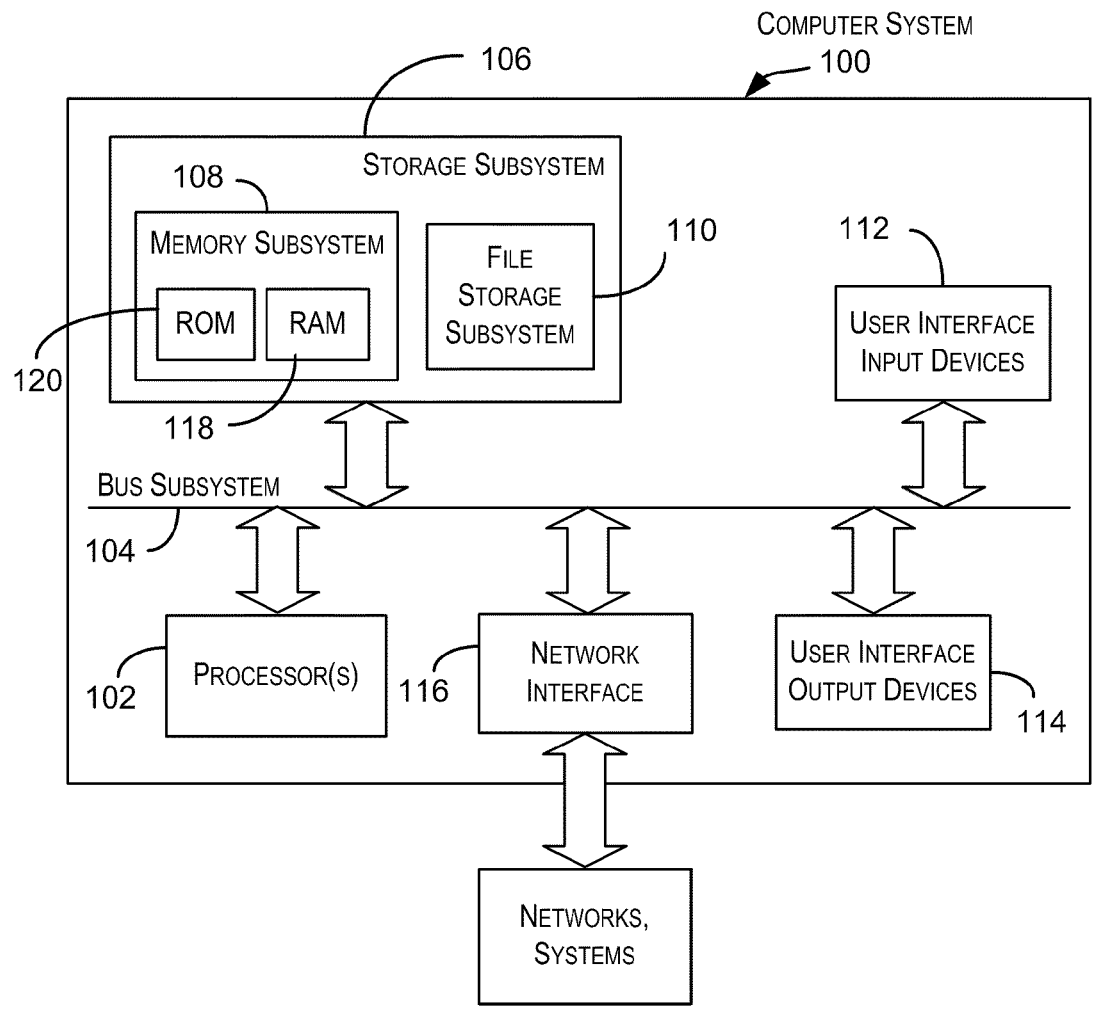
FIG. 1 is a simplified block diagram of a computer system that may be used to practice an embodiment of the present invention.

In the following description, various embodiments of the present invention will be described. For purposes of explanation, specific configurations and details are set forth in order to provide a thorough understanding of the embodiments. However, it will also be apparent to one skilled in the art that the present invention may be practiced without the specific details. Furthermore, well-known features may be omitted or simplified in order not to obscure the embodiment being described.

The following description describes an embodiment of the present invention in the business policy domain, and specifically to a forensic tool for monitoring business policies. As used herein, a policy may include a set of one or more conditions such that, if the one or more conditions are fulfilled, a policy violation occurs. The scope of the present invention, however, is not restricted to business policies, but may be applied to other domains or applications. For example, any domain or application where a set of rules or criteria is used to analyze data may make use of the present invention. Examples of domains in which embodiments of the present invention may be used include segregation of duties, separation of powers, transaction monitoring, fraud or other crime detection, semantic web applications, and generally applications dealing with large sets of data.

In general, embodiments of the present invention provide techniques for displaying information related to policies. In one embodiment, data is analyzed in order to identify policy violations. When a policy violation is identified, semantic objects related to the policy violation may be identified. For example, a single invoice may be paid twice by an organization, either by fraud, mistake, or otherwise. Data may be analyzed to find such duplicate payments according to a policy that is violated when duplicate payments were made for the same invoice. Once duplicate payments are found, semantic objects relating to the payments may be identified. For example, invoices are related to payments, and therefore may be identified. Purchase orders are also related to invoices and, therefore, may also be identified. Other semantic objects related to payments may include employees involved in making the payments, payment receipts, and the like.

Once the semantic objects related to the policies are identified, an arrangement of graphical objects representative of the semantic objects, in an embodiment, are determined and the arrangement may be displayed. In an embodiment, the graphical objects are nodes and the arrangement is a graph having edges that indicate relationships among the identified semantic objects. For example, the arrangement may be a directed graph where the direction of an edge between two nodes indicates an aspect of a relationship between the nodes. An edge directed from one node to another may, for instance, that one caused the other, such as a receipt being caused by a payment. Other relationships may also be represented by the direction of an edge. An edge from one node to the other may, for example, indicate membership in a set (such as a particular employee being a manager) or inclusion as a subset of a set (such as managers being a subset of employees). Generally, any relationship between semantic objects may be indicated.

Embodiments of the present invention provide users the ability to view arrangements of graphical representations of semantic objects at different levels of granularity in order to better understand relationships between semantic objects in an organization. As discussed, a policy violation may occur when data of one system fulfills the conditions of the policy. However, the data that meets the conditions may be related to other data in another system. Continuing with the duplicate payment policy violation, accounting system data may indicate violation of the policy. However, sales people identified in a CRM system may be related to the payments. Accordingly, in an embodiment, users are provided the ability to view arrangements of graphical representations of semantic objects, where the semantic objects are from different systems of an organization. Examples of such are provided in FIGS. 3-4.

Turning now to the drawings, FIG. 1 is a simplified block diagram of a computer system 100 that may be used to practice an embodiment of the present invention. For example, the computer system 100, or a variation thereof, may be used to provide a user interface in accordance with the disclosure below. Computer system 100 may serve as a user workstation or server, such as those described in connection with FIG. 2 below. As shown in FIG. 1, computer system 100 includes a processor 102 that communicates with a number of peripheral subsystems via a bus subsystem 104. These peripheral subsystems may include a storage subsystem 106, comprising a memory subsystem 108 and a file storage subsystem 110, user interface input devices 112, user interface output devices 114, and a network interface subsystem 116.

Bus subsystem 104 provides a mechanism for letting the various components and subsystems of computer system 100 communicate with each other as intended. Although bus subsystem 104 is shown schematically as a single bus, alternative embodiments of the bus subsystem may utilize multiple busses.

Network interface subsystem 116 provides an interface to other computer systems, networks, and portals. Network interface subsystem 116 serves as an interface for receiving data from and transmitting data to other systems from computer system 100.

User interface input devices 112 may include a keyboard, pointing devices such as a mouse, trackball, touchpad, or graphics tablet, a scanner, a barcode scanner, a touch screen incorporated into the display, audio input devices such as voice recognition systems, microphones, and other types of input devices. In general, use of the term "input device" is intended to include all possible types of devices and mechanisms for inputting information to computer system 100. A user may use an input device in order to execute commands in connection with implementation of specific embodiments of the present invention, such as to utilize an embodiment of the invention in order to investigate policy violations in environments, such as the environment described below in connection with FIG. 2.

User interface output devices 114 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 100. Results of implementing policies, defining policies, performing forensic investigation of data involved in any policy violations, and configuring various components of a computer system may be output to the user via an output device.

Storage subsystem 106 provides a computer-readable medium for storing the basic programming and data constructs that provide the functionality of the present invention. Software (programs, code modules, instructions) that when executed by a processor provide the functionality of the present invention may be stored in storage subsystem 106. These software modules or instructions may be executed by processor(s) 102. Storage subsystem 106 may also provide a repository for storing data used in accordance with the present invention, for example, the data stored in the diagnostic data repository. For example, storage subsystem 106 provides a storage medium for persisting one or more ontologies.

Storage subsystem 106 may comprise memory subsystem 108 and file/disk storage subsystem 110.

Memory subsystem 108 may include a number of memories including a main random access memory (RAM) 118 for storage of instructions and data during program execution and a read only memory (ROM) 120 in which fixed instructions are stored. File storage subsystem 110 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Computer system 100 can be of various types including a personal computer, a portable computer, a workstation, a network computer, a mainframe, a kiosk, personal digital assistant (PDA), cellular telephone, a server, or any other data processing system. Due to the ever-changing nature of computers and networks, the description of computer system 100 depicted in FIG. 1 is intended only as a specific example for purposes of illustrating the preferred embodiment of the computer system. Many other configurations having more or fewer components than the system depicted in FIG. 1 are possible.

Figure 2:
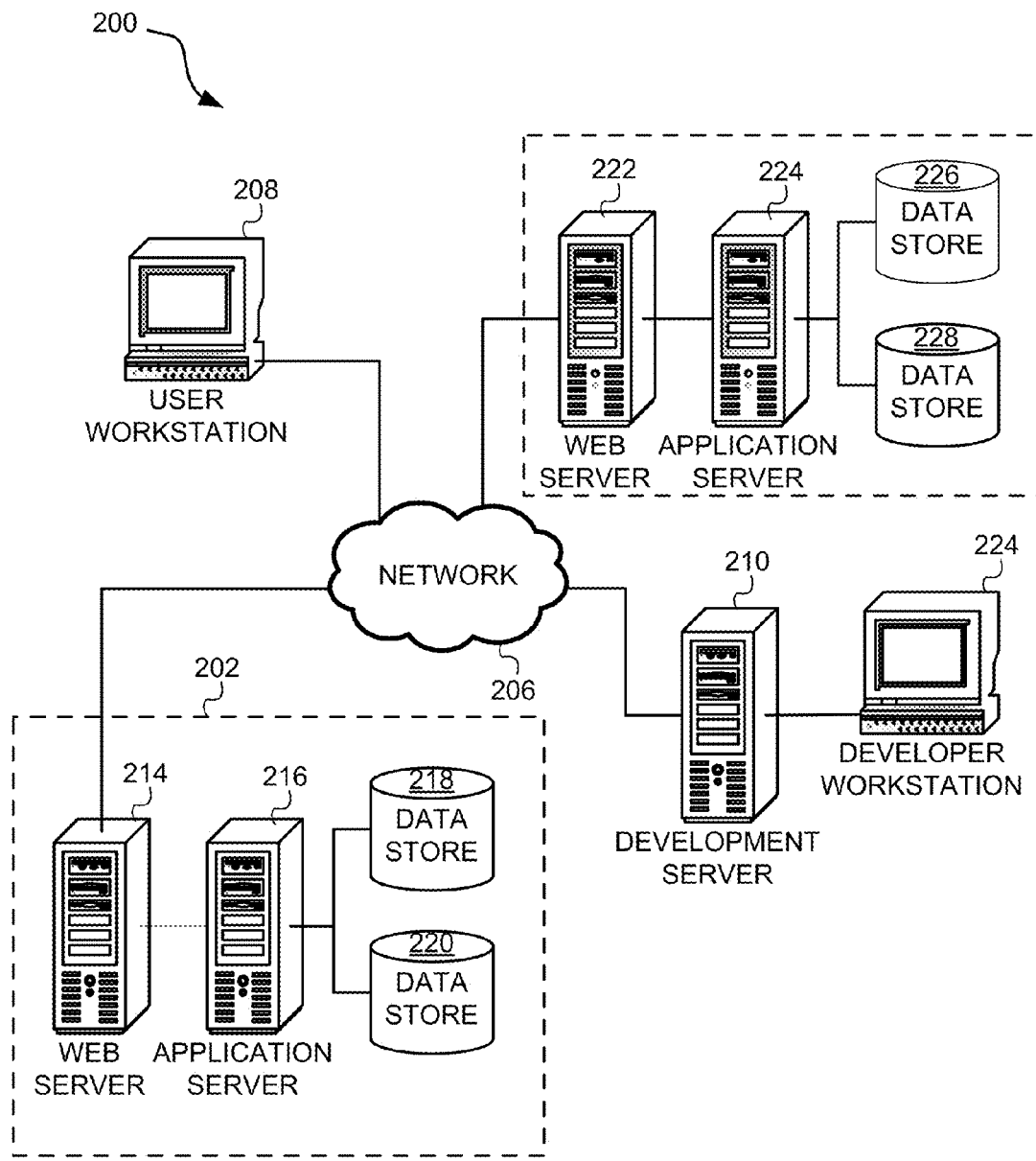
FIG. 2 is an example of an environment in which embodiments of the invention may be practiced.

FIG. 2 shows a simplified block diagram of an enterprise computer system 200 that may be used to practice an embodiment of the present invention. It should be understood that, generally, enterprise computer systems vary greatly and, as a result, specific embodiments may include more or less components than shown in the figure and that the specific components shown in FIG. 2 are only intended to provide an example for the purposes of illustration. In addition, embodiments of the present invention may be applicable in environments other than enterprise computer systems, such as in computing systems in general where policy violations may occur.

In accordance with an embodiment, the enterprise computer system 200 includes a first location 202 and a second location 204 communicatively connected by a network 206, such as the Internet or any suitable communications network or combination of networks. In an embodiment, the first location 202 and second location 204 correspond to separate physical locations of a business, such as offices in two separate cities, states, or countries. While FIG. 2 shows two locations, it should be understood that a business may have only a single location and may include more than two locations. As shown in the drawing, the enterprise computer system 200 may include one or more user workstations 208, a development server 210, and a developer workstation 212. The user workstation 208, development server 210, and/or development workstation 212 may be physically present at any of the locations, or at separate locations. In an embodiment, the user workstation 208 and development server 210 are communicatively connected to the network 206 so as to access various components of the enterprise computer system. For example, the user workstation 208 may include a browser used for viewing content provided from the Internet and/or from other systems within the business. Further, the developer workstation 212 may be connected to the network 206 through the development server 210 and may be adapted to enable certain employees within the organization to configure, install, modify, and perform other actions in connection with the business' computing systems. As an example, a developer within the organization may utilize the developer workstation in order to create policies that are used to define policies and execute one or more applications that stores data in one or more ontologies, and that reason the data according to the policies in accordance with various embodiments of the invention. Instructions for controlling the applications and the defined policies may be sent over the network 206 to an appropriate computing device executing the one or more applications.

As noted above, the first location 202 may include various computer systems used in operating the business. For example, as depicted in FIG. 2, the first location 202 includes a web server 214 configured to receive requests from various users, such as from a user of the user workstation 208, and to respond to the requests over the network 206. While FIG. 2 shows the web server as a hardware component, as with any of the servers described herein, the web server may also be a software module operating on a computer system. Responses from the web server 214 may be provided from the web server 214 itself or through the web server 214 but from a variety of sources in communication with the web server 214, such as from components of an internal computer system of the first location 202 or from other web servers located at other, possibly third-party, locations.

In an embodiment, the web server 214 is communicably coupled to an application server 216, which is a hardware component or software module configured to run one or more applications, such as one or more policy engines and other applications for managing organizational data. As is known, a user of the user workstation 208 may send a request to the web server 214 that specifies a specific action to be taken in connection with an internal business application implemented on the application server 216. The web server 214 then relays the request to the application server 216 which takes the specified action and returns the result of that action to the web server 214, which in turn relays the result to the user workstation 208. In accordance with an embodiment, the web server 214, or other component, may modify the content returned to the user workstation 208 in accordance with one or more policies applicable to a user of the user workstation 208.

As shown in the example of FIG. 2, the application server 216 interacts with data stored in a first data store 218 and a second data store 220, each of which may store data relevant to the business' operation, such as in one or more relational or other databases. While the disclosed example shows the first location 202 having two data stores, it should be understood that the first location 202 may have less than two data stores or more than two data stores. Information in the data stores can include a wide variety of data, such as data relating to business transactions, invoices, human resources data, user account data, receipts, bank account data, accounting data, payroll data, and generally, any data relevant to the operation of a particular business. Information from the data stores 218, 220, and other sources, may be extracted from the data stores, converted to a uniform format, and stored in an ontology in accordance with an embodiment.

In an embodiment, the second location includes its own web server 222, application server 224, first data store 226, and second data store 224 which may be configured to function similarly to the identically named components above.

Figure 3:
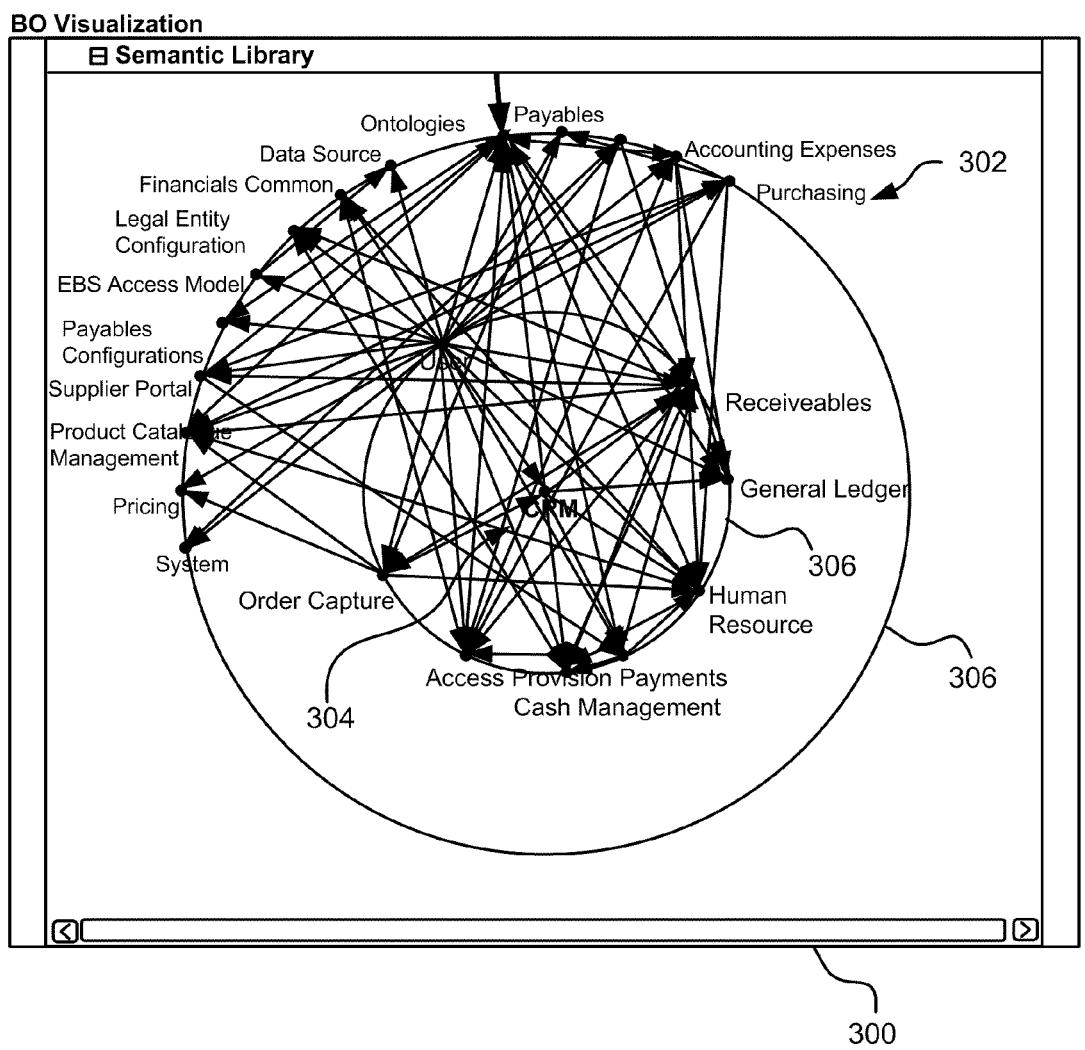
FIG. 3 shows an example interface page showing an arrangement of nodes representing a semantic library of an organization, in accordance with an embodiment.

FIG. 3 shows an example interface page 300 for an application for performing forensic investigation of policy violations, in accordance with an embodiment. The interface page 300, for instance, may be used to investigate any policy violations relating to data generated by and/or stored in any of the systems described above in connection with FIG. 2. The interface page 300 includes a radial graph 302 comprising a plurality of nodes with edges connecting pairs of the nodes. The radial graph 302, in this example, includes a central node 304 around which a plurality of concentric circles 306 are positioned. The concentric circles 306, in an embodiment, represent degrees of separation from the central node 304 according to a relationship represented by edges of the graph 302, where an edge connecting two nodes may indicate a direct relationship between the two nodes. Thus, each node on the inner concentric circle 306, in this example, is directly related to the central node 304 while each node on the outer concentric circle 306 is connected with the central node 304 by at least two edges. The relationships represented by the edges may be as described above, or otherwise as appropriate for specific applications of the invention. Also, while the example shows two concentric circles 306, there may be none, one, or more than two.

In an embodiment, the nodes of the graph 302 represent semantic domains of an organization, where a semantic domain includes a set of semantic objects. The semantic domains, in an embodiment, correspond to various areas of an organization's operations. In the example shown, as indicated by the labels of the nodes in the figure, semantic domains represented by the nodes of the graph 302 include a CRM domain represented by the central node 304, an HR domain represented by a node on the inner concentric circle 306, a product catalog management domain represented by a node on the outer concentric circle 306, and other domains. In various embodiments, the semantic domains in a graph may differ from those in the figure, as appropriate.

In an embodiment, a user to whom the interface page 300 is displayed is able to manipulate the graph 302 utilizing one or more input devices, such as a mouse, touchpad, touch screen, keyboard, and the like. For example, a user may be able to use a drag operation to drag a node from one of the concentric circles 306 to their center. As a result of such an operation, in an embodiment, an application causing display of the interface page 300 would display the dragged node in the center and display other nodes on one or more concentric circles according to their relationships with the dragged node. In this manner, a user may place a node in the center of the graph 302 in order to study the relationship of a semantic domain represented by that node with other semantic domains represented by other nodes. As another example, a user may be able to perform zoom operations in connection with the graph 302. The upper portion of the graph 302, for instance, includes numerous nodes closely spaced together such that the labels of the nodes intersect one another, making reading of the labels by a user difficult. Accordingly, the user may enlarge the upper portion of the graph 302 to cause the labels of the nodes to be more distinctly displayed. Also, the user may shrink the graph 302 such that more of the graph 302 is visible in the interface page 300. For instance, as shown in the figure, an edge of the graph 302 is only partially displayed. A user, therefore, may decrease the size of the graph 302 to make visible a node to which the partially displayed edge is connected.

Other features may also be provided for the interface page 300. Possible features include the ability for users to hide edges and/or nodes that are not of interest to the users, scrolling in order to put different portions of the graph 302 in a central portion of the interface page 300, rotation of the graph 302, relocation of nodes relative to one other (such as in different places on the same concentric circle 306), and the like. In addition, users may have the ability to annotate nodes, to cause nodes to appear differently (such as by appearing as different shapes or colors), and otherwise to manipulate the graph 302 or cause the graph 302 to be manipulated based at least in part on one or more criteria.

Further, one or more attributes may be assigned to the nodes based on some characteristic of a semantic domain (or semantic object) represented by the node. The visual display of a node may depend on the attribute(s) assigned to it. For example, if a policy violation is related to semantic objects in domains represented by one or more nodes, the one or more nodes may have a different appearance than other nodes. The nodes related to the policy violation, for instance, may be colored red while the other nodes are another color, may be a triangle while the other nodes are circular, or may otherwise be distinguished from the other nodes. In addition, attributes assigned to a node may be of several degrees, where the appearance of the node additionally depends on the degree of the attribute. As an example, the size of a node may vary based on the number of policy violations related to semantic objects within the semantic domain represented by the node. Also, generally, an attribute of a node may be related to a calculated probability that a policy violation involved the node.

Figure 4:
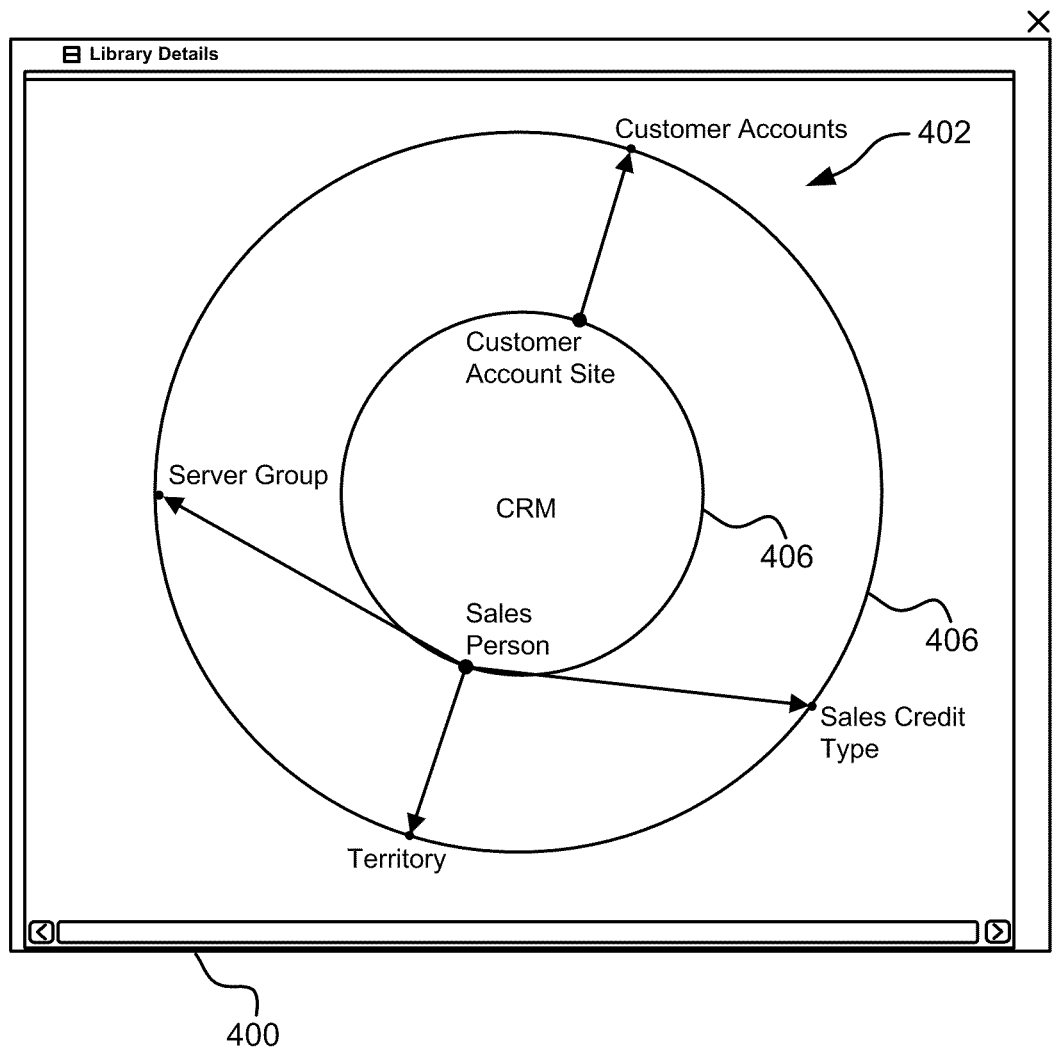
FIG. 4 shows an example interface page showing details of one of the nodes of the semantic library shown in FIG. 3, in accordance with an embodiment.

In an embodiment, users may select one or more of the nodes of the graph 302 to investigate semantic domains represented by the one or more nodes. Accordingly, FIG. 4 shows an interface page 400 on which a graph 402 representing a semantic domain is displayed. As indicated by "CRM" appearing in the center of the graph 402, in this example, the graph 402 represents a CRM semantic domain. The nodes of the graph 402 represent semantic objects of the CRM domain and are labeled accordingly. The interface page 400 may appear upon user selection (such as by mouse click or other input operation) of the node labeled "CRM" in the graph 302 of FIG. 3. The interface page 400 of FIG. 4 may appear in place of the interface page 300 of FIG. 3, may appear next to the interface page 300 of FIG. 3, or otherwise. In an embodiment, the interface page 400 of FIG. 4 appears next to the interface page 300 of FIG. 3 as a result of the CRM node of FIG. 3 being a central node of the graph 300. Thus, in an embodiment, a user causes a node of the graph 302 of FIG. 3 to be a central node, then a corresponding semantic domain appears next to the graph or in place of the graph.

Returning to FIG. 4, as noted, the graph 402 includes semantic objects of a CRM domain. For example, as shown in the figure, the graph 402 includes nodes labeled as customer account sites, customer accounts, server group, sales person, territory, and sales credit type. Similar to the graph 302 of FIG. 3, the graph 402 of FIG. 4 includes concentric circles 406, which may indicate degrees of separation according to relationships represented by edges of the graph 402. For example, as indicated by the edge connecting the sales person node on the inner concentric circle 406 and the territory node on the outer concentric circle 406, there is at least one degree of separation between the sales person and territory nodes. Generally, in users may be provided abilities to manipulate the display of the graph 402 in manners similar to those discussed above.

For example, as the nodes of the graph 302 of FIG. 3 represent semantic domains, the nodes of the graph 402 may represent semantic sub-domains. Thus, one or more of the nodes of the graph 402 may represent a sub-domain of the CRM semantic domain. The server group node, for example, may represent a plurality servers that perform CRM functions. User selection of the server group node may result in a graphical representation of all of the servers used by an organization for CRM functions. The graph may be, for instance, a graph consisting of one node for each server. Edges may or may not connect pairs of the server nodes. Simultaneous selection of the sales person node and territory node may, for example, cause display of a graph having nodes that correspond to specific sales people and nodes that correspond to specific territories. Edges may connect sales people to the territory or territories to which they are assigned.

Figure 5:
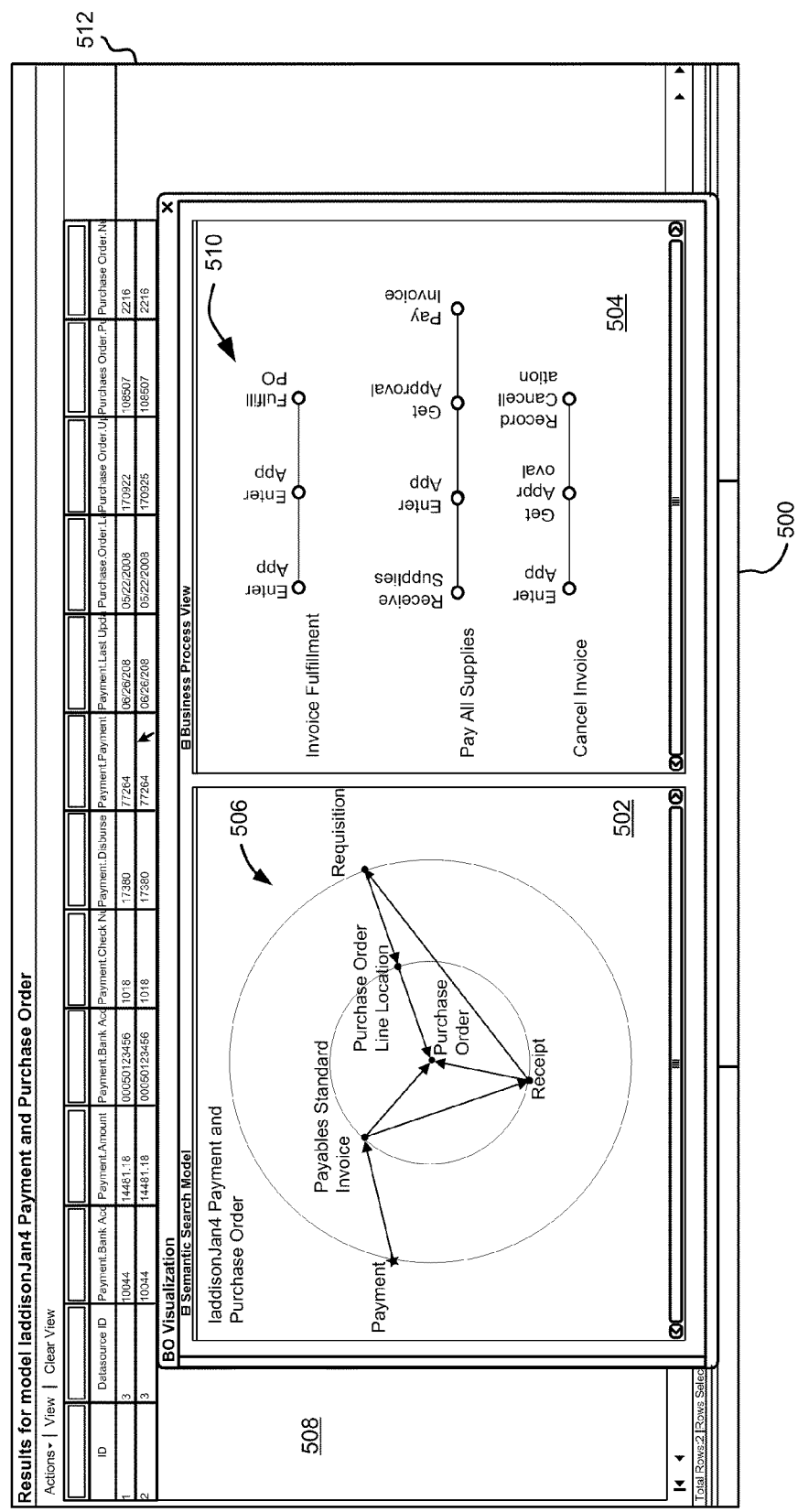
FIG. 5 shows an example interface page showing an arrangement of nodes representing semantic objects involved in a policy violation, in accordance with an embodiment.

As discussed, user may have the ability to view semantic objects related to policy violations. Accordingly, FIG. 5 shows an interface page 500 for displaying representations of semantic objects related to a policy violation, in accordance with an embodiment. As shown, the interface page 500 includes a left pane 502 and a right pane 504. The left pane 504, in an embodiment, includes a plurality of nodes forming a graph 506. The nodes of the graph 506, in the example shown, correspond to semantic objects related to a violation of a policy that is violated when duplicate payments are made for a single invoice. As noted in a back pane 508, which will be discussed more completely below, a single violation (two payments for the same invoice) was found in this example, although multiple violations may have been found. The nodes of the graph 506 correspond to semantic objects that are related to the policy violation that was found. In this example, as indicated by the labels of the nodes, the policy violation is related to at least one payment, payables standard invoice, receipt, purchase order, purchase order line location, and requisition. It should be noted that more semantic objects may be related to the violation than shown in the graph 506. For example, a receipt may be related to several semantic objects, such as a receipt amount, a provider of the receipt, line items, tax amounts, and the like. In an embodiment, a user may cause one or more objects related to an object represented in the graph in a manner described above, such as by selecting one of the nodes. Thus, in an embodiment, the user may select the receipt node to cause display of representations of semantic objects related to receipts and their relationships to the rest of the graph 506.

As shown in FIG. 3, numerous semantic objects may be related together across multiple semantic domains, perhaps by many degrees of separation. In an embodiment, semantic objects of interest are identified during policy definition such that, when policy violations are identified, related semantic objects of interest are also identified. An example of identification of semantic objects of interest is in U.S. application Ser. No. 12/714,206, filed Feb. 26, 2010, which is incorporated herein by reference for all purposes. In the duplicate payment example, for example, payments themselves violate the policy. However, during policy creation, a user may specify that he or she is interested in other information relating to payments that violate the policy, such as any invoices that were paid twice, any requisitions that resulted in the invoices that were paid twice, and the like. In this manner, a user may specify what information is of interest in order to avoid too much or too little information being displayed.

In addition, defaults may be used in order to allow a useful number of semantic objects related to policy violations to be identified, but requiring minimal work from the user. For example, for data identified as violating a policy that corresponds to one or more semantic objects, other objects within a predetermined number of degrees of separation of the one or more semantic objects may also be identified. For instance, with the duplicate payments example, all semantic objects within one degree of separation of payments may be identified in a graph. In addition, default semantic objects may be assigned other semantic objects such that, if data relating to a semantic object is identified as violating a policy, then the default semantic objects may be identified in a graph. For instance, purchase orders and invoices may be assigned to payments such that, if payments are identified as violating a policy, purchase orders and invoices are also identified. Any defaults used, in an embodiment, may be changed by the user according to appropriate user input.

In the example of FIG. 5, as discussed, a duplicate payment violating a policy was identified and semantic objects related to the identified payment are represented in the graph 506 as nodes. Edges of the graph may indicate relationships between semantic objects represented by the nodes. As discussed above, the appearance of the edges may indicate an aspect of a relationship between semantic objects. In this particular example, the graph 506 is a directed graph and, accordingly, the edges appear as arrows. The direction of an arrow may indicate a causal relationship between nodes. For the identified payments, for example, the edge between the receipt node of the graph 506 and the purchase order node points to the purchase order node. The reason may be because a receipt identified during analysis of the data according to the policy was created as a result of a purchase order being created. Likewise, the edge between the payment node and the payables standard invoice node points to the payables standard invoice node, perhaps because one or more payments were made for one or more payables standard invoices. As discussed, the direction of an edge may also represent other relationships, such as membership in a set, subset inclusion, a relationship in a hierarchy, and other relationships.

Edges may also have different appearances indicative of relationships or aspects of relationships between semantic objects represented by nodes. Edges may vary in color based on some aspect of a relationship or based on a type of relationship. Edges representative of a causal relationship, for instance, may be displayed as one color while edges representative of another relationship may be displayed as another color. Line thickness, patterns, and the like may also be used to indicate something about the relationships between objects represented by nodes. As yet another example, edges may be bi-directional arrows for certain relationships. For instance, if one particular payment caused an invoice to be created, and another invoice caused another payment to be made, there may be a bi-directional arrow between a payment and invoice node to indicate that at least one payment was caused by an invoice and at least one invoice was caused by a payment.

Turning to the right pane 504, the right pane shows graphical representations of workflows involved in identified policy violations, in an embodiment. A workflow, in an embodiment, is a set of steps for accomplishing one or more results. The set of steps may be a sequence and workflow may be orchestrated by one or more workflow applications, such as Oracle® Workflow available from Oracle International Corporation. The steps may be completed by a human, a computer, both, or otherwise. In the example shown in FIG. 5, the workflows are shown as a sequence of nodes connected by edges, where each node represents a step in the workflow and the sequence of steps of a workflow proceeds from left to right. For example, the right pane 504 includes a first workflow 510 for fulfilling invoices. In this example, the first workflow 510 is included because the fulfilling invoices involves payments, where the example policy is related to duplicate payments. The first workflow 510, in this example, includes the steps, from left to right, of entering an application, getting approval, and fulfilling a purchase order.

In an embodiment, workflows involving data violating a policy are identified based on the data analyzed in order to determine whether a policy is violated and, in an embodiment, based on semantic objects representing the analyzed data. For instance, in the example of FIG. 5, because payments were analyzed in order to determine whether a duplicate payment policy was violated, workflows that create, cancel, or modify payments have been identified. In another embodiment, data that is found to be part of a policy violation may be used in order to identify specific workflows involved with the data. For instance, there may be numerous workflows that generally involve creation, cancellation, or modification of payments, but the workflows identified in the right pane 504 may be the specific workflows that were involved in creating, cancelling, or modifying the specific payments that were found to violate the policy. In this example, another workflow that generally involves payments may have been excluded because that workflow was not involved with the specific payments identified as violating the policy. In this manner, users are able to see what processes were involved with or may have been involved with policy violations. Thus, users are able to effectively investigate the policy violations and take appropriate action.

The workflows displayed as related to the policy violations may be identified in various ways. For example, in an embodiment, the relevant work flows are input by a user, such as during creation of the policy. For instance, a user may know that certain workflows could result in a violation of a policy or that certain workflows are higher risk for policy violations than others and the user may select workflows of interest accordingly. Workflows may also be identified automatically. In an embodiment, workflows are identified from an index that associates semantic objects (such as payments) with workflows related to those semantic objects. The application may reference the index when appropriate, such as when requested to cause display of appropriate workflows similar to those shown in the right pane 504. Generally, any suitable process for identifying relevant workflows may be used.

In an embodiment, the graph 506 and/or workflows are displayed in connection with actual data involved with policy violations. For example, as noted above, the example interface of FIG. 5 shows a back pane 508 that includes a table 512. The table 512, in this embodiment, identifies the payments that violate the policy and provide other information about the payments, such as the dates they were made, identification numbers, bank account numbers, and the like. The back pane 512 provides users an opportunity to view the actual data that is involved in a policy violation. In an embodiment, the columns of the table correspond to data related to the data identified as involved in violating a policy. The columns, for instance, may correspond to one or more attributes of the data involved in violating a policy, data related to the data involved in violating the policy, or otherwise. In an embodiment, the columns correspond to a user selection of information to be included with data identified as being involved in policy violations. For instance, when defining a policy, a user may specify conditions on particular data that indicate a policy violation. A user may also specify other data to be identified, but which does not directly have an effect on whether the policy is violated. Duplicate payments for a single invoice, for instance, may violate a policy regardless of the identify of the employee(s) who made the payments and the bank account(s) used to pay the invoices. Thus, in an embodiment, a user may specify that, for any payments that are identified as violating a duplicate payment policy, the employee(s) who made the payments and the bank account(s) used to make the payments should also be identified. Defaults may also be used such that, for example, if one or more semantic objects are involved in a policy violation, other semantic objects are identified by default. For example, the information in the table 512 may have been information included with payments by default.

As shown in FIG. 5, the left pane 502 and right pane 504 are shown as part of a single interface window that is superimposed on the back pane 508. It should be noted that this configuration is provided for the purpose of illustration, and that other configurations are possible. For example, all the information provided in the left pane 502, right pane 504, and back pane 508 may be provided in a single window or, generally, in another manner than illustrated in the figure. Other variations are also within the spirit of the present invention.

Figure 6:
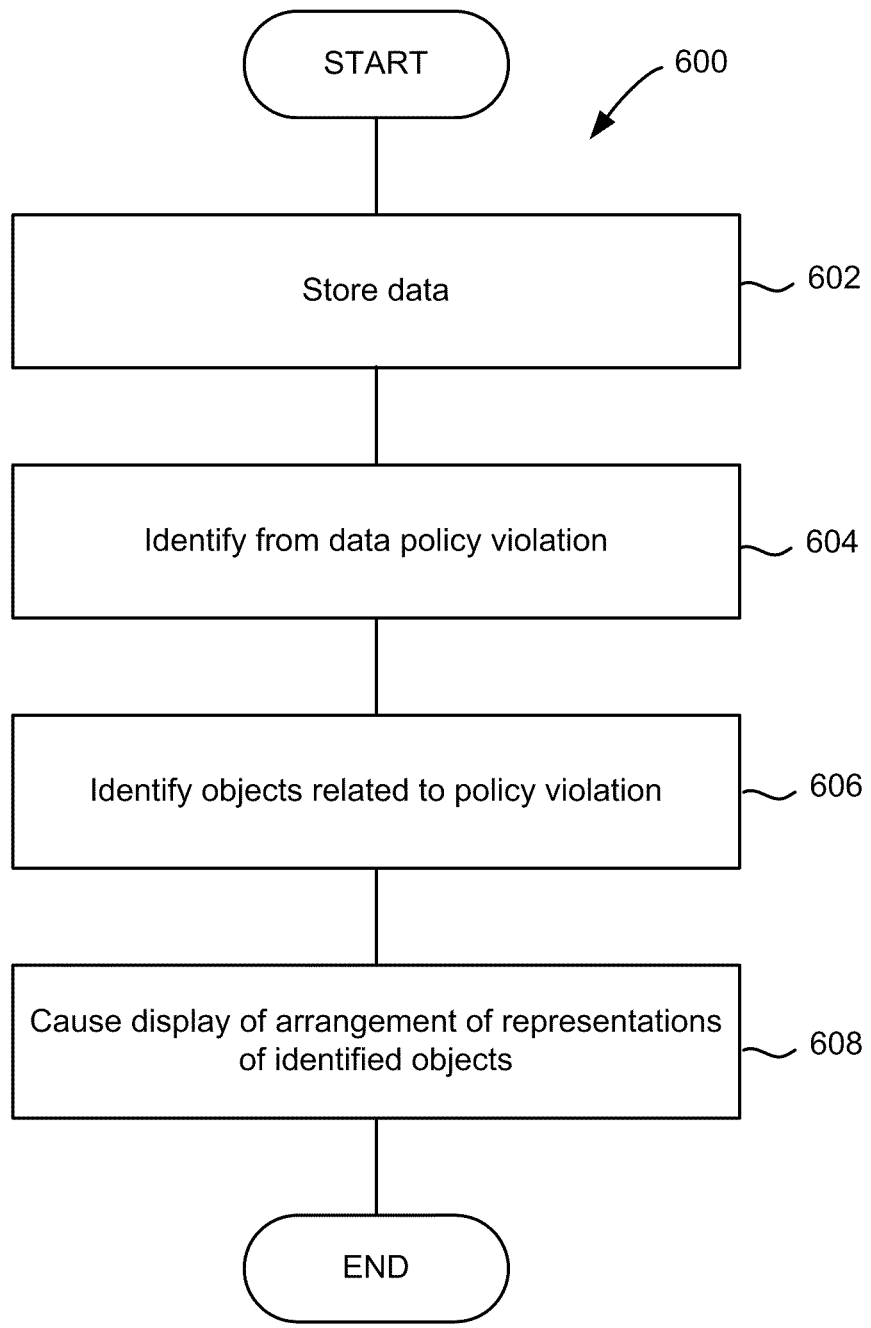
FIG. 6 shows a process for displaying information, which may be used to produce the interface pages shown in FIGS. 3-5, in accordance with an embodiment.

FIG. 6 shows a process 600 for displaying information, in accordance with an embodiment. The process 600 may be used to cause display of information in accordance with the above description. Further, the process 600, or variations thereof, may be performed under the control of one or more computer systems configured with executable instructions. The executable instructions may be stored on a computer-readable storage medium or stored on a plurality of computer-readable storage media.

In an embodiment, data is stored 602 in one or more data stores. As discussed above, the data may be generated during the course of an organization's operations. Thus the data may be from a plurality of data stores used for various purposes of an organization, such as for purposes related to CRM, HR, accounting, and the like. The data may, in another embodiment, be from a single data source, or a plurality of data sources that share a common format. In an embodiment, the data from various sources is loaded into a common data store, which may be referred to as a knowledge repository. A plurality of adaptors that enable conversion of data from a different original formats to a common format may be used. For example, for each of a plurality of formats used by an organization, an adaptor may convert data from an original format to the common format according to a mapping from the original format to the common format. The common format may be an Ontology Web Language (OWL) format that stores data from a plurality of data stores into an OWL format according to an ontology that represents semantic objects of an organization and the relationships among the semantic objects, although other formats may be used. Data may be moved into the common data store in a batch process, incrementally, or otherwise. Further, in another embodiment, data remains in one or more data stores utilized by one or more applications without loading the data into a common data store.

In an embodiment, the stored data is analyzed in order to identify 604 whether any policy violations have occurred. In an embodiment, analyzing the data includes determining from the data whether the conditions of one or more policies are fulfilled. For example, in the example discussed in detail above, data was analyzed to determine whether duplicate payments for the same invoice were made. Other analysis may also be performed. If a policy violation is identified, in an embodiment, semantic objects related to the policy violation are identified 606. In an embodiment, the identified semantic objects include semantic objects representing the data that causes the policy violation, such as the duplicate payments discussed above. The identified semantic objects may include other semantic objects that are related to the data causing the policy violation according to one or more relationships defined among the semantic objects. As discussed, a plurality of relationships may be defined for semantic objects. These relationships may be used to identify semantic objects within a number of degrees of separation from semantic objects representing data involved in the policy violation. Also, the objects may have been pre-selected by a user, such as a user that defined the policy. Generally, any suitable manner of identifying semantic objects related to the policy violation may be used.

Once the semantic objects related to the identified policy violation are identified, a graphical arrangement of representations of the objects may be displayed or, more generally, caused to be displayed. The arrangement, in an embodiment, may be configured to demonstrate the relationships among the semantic objects represented by the representations. As discussed above, for instance, the arrangement may be a directed graph comprising a plurality of nodes. Each node may represent a semantic object and/or a set of semantic objects, such as a semantic domain. Edges of the graph, as discussed, may be caused to appear in a manner that indicates one or more aspects of one or more relationships between nodes. In an embodiment, the edges are arrows, where the direction of the arrow indicates an aspect of a relationship between two nodes connected by the arrow. An edge of a graph may, for example, indicate the relationship between two semantic objects of an ontology. An edge of a graph may, as another example, indicate conditional independencies of a Baysian network, such as a causal Baysian network. Thus, for instance, an edge of a graph may indicate a probability of a causal relationship between data represented by nodes connected by the edge. Colors or other attributes of the edges and/or nodes may correspond to the probability. The arrangement, nodes, and edges may vary, such as in manners discussed above.

As an example of how embodiments of the invention may be used in connection with Baysian networks, nodes in a graph may be associated with conditional probabilities that are related to other nodes. For example, in an embodiment, nodes in a graph may represent an aspect of a semantic object being in a particular state (such as fraudulent, in error, in existence, and the like). The probability of one node being in a certain state given that a parent node is in a particular state may be calculated for each parent of the given node. For the node, a table that organizes these conditional probabilities may be created and stored for the node, and similar tables may be constructed and stored for other nodes. The table may include a column for each parent node and a row for each combination of possible states of the parent nodes. Another column that includes the conditional probability of the given node being in a particular state may be included, where the rows of this column store probability values of the node being in a particular state given that the parent nodes are in states indicated in the same row of the table. For an illustrative example, the following shows a conditional probability table for a node C that has parent nodes A and B:

| A | B | P(C) |
|---|---|------|
| f | t | 0.4  |
| t | t | 0.3  |
| f | f | 0.2  |
| t | f | 0.1  |

In this table, the probability of C being in a particular state given that A and B are either true or false is given. For instance, in the first row, the probability of C being in a particular state given that A is false and B is true is shown as 0.4. As an illustrative example, C could represent a fever, A could represent a cold, and B could represent the Flu. Thus, as shown in the second row of the table, the probability of a person having a fever given that the person has a cold (A being true) and the flu (B being true) is 0.3. In this particular example, another condition that can cause a fever (such as a bacterial infection) could be included into the table and the table would be increased by one column for the condition and the number of rows would increase to accommodate additional combinations of all of the conditions being true or false.

In a business environment, the nodes may represent various semantic objects, such as invoices, payments, receipts, employees, and other objects. Conditional probability tables may be calculated for some or all of the nodes. In one embodiment, the conditional probabilities calculated for a node are the probabilities that a policy violation occurred with respect to the semantic object represented by the node given that a policy violation did or did not occur with respect to semantic objects represented by the parents of the node. Looking to FIG. 5, for example, a conditional probability table may be calculated that stores the probabilities of a policy violation occurring for a purchase order given that a policy violation did or did not occur for a receipt associated with the payables standard invoice. Similarly, a conditional probability table may be calculated that stores the probability of a policy violation occurring with a purchase order given that a policy violation did or did not occur with respect to a payables standard invoice, purchase order line location, or receipt associated with the purchase order. Calculations of probabilities may be made in any suitable manner, such as by calculating probabilities based on historical observations in data or by assigning probabilities based at least in part on empirical observations and updating assigned probabilities over time based on actual observations.

In an embodiment, the graph shown in FIG. 5 is constructed and conditional probabilities for one or more of the nodes are calculated based on the parent nodes of the one or more nodes. In this manner, a Baysian network is superimposed on a graph. However, it should be noted that conditional probabilities may be calculated for semantic objects and a graph may be constructed using the probabilities. For instance, the probabilities of policy violations occurring in semantic objects given that policy violations have occurred in other semantic objects may be calculated using various statistical techniques. A graph may be constructed using the calculated probabilities. The graph may include, for instance, nodes corresponding to semantic objects. An edge may connect two nodes, for instance, when the probability of a policy violation in one occurring given that a policy violation occurred in another is above a determined threshold value, which may be specified and/or modified by a user. As discussed above, the edges may be directed edges, where the direction indicates causality. In this manner, a graph is constructed that provides a visual indication of origins of risk and that allows users to follow edges in the graph to discover and/or investigate potential sources of risk. Combinations and variations of the foregoing techniques may also be used.

In an embodiment, nodes and/or edges are assigned visual characteristics based at least in part on values in related conditional probability tables or other objects for storage of probabilities. For instance, the thickness of edges or some other visual characteristic may vary based on the conditional probability of associated nodes. Thus, for example, the higher the probability of a policy violation occurring in one node given a policy violation in the parent node, the thicker the edge between the node and its parent may be. Similarly, color and/or other visual characteristics of displayed nodes may vary based at least in part on probability values. The color of a node may correspond to the probability of a policy violation occurring in connection with a semantic object represented by the node. Colors for nodes may be assigned probability ranges. For instance, red may be assigned to nodes having probability of policy violations being greater than 0.5 while orange may be assigned to nodes having probability between 0.25 and 0.5 and yellow may be assigned to nodes having probability less than 0.25. Similarly, a color spectrum may be mapped by a monotonic function to a visible color spectrum so that small changes in probability cause small changes in node colors in corresponding nodes. Generally, edges, node color, node shape, and generally any visual characteristic may be associated with probabilities calculated for nodes or other values calculated for nodes.

Causing the display of the arrangement may be performed in many ways. For instance, a file with instructions for rendering the arrangement may be sent to an application, such as browser, or to hardware operable to display the arrangement. As a specific example, the arrangement may be generated as an image file and an hypertext markup language (HTML) document referring to the image file may be sent to a user's browser such that the user's browser may display. Generally, any manner of causing the display of the arrangement may be utilized.

Other variations are within the spirit of the present invention. Thus, while the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method of displaying information, comprising:

identifying, based at least in part on data stored in a data store, a policy violation;

identifying a plurality of semantic objects that cause the policy violation, the identified plurality of semantic objects including semantic objects of different semantic object types, the identified plurality of semantic objects representing data related to a business policy in an organization;

computing a probability of occurrence of the policy violation in each semantic object of the identified plurality of semantic objects, the probability of occurrence of the policy violation comprising data that represents a relationship between a first state of a first semantic object of the identified plurality of semantic objects and a second state of a second semantic object of the identified plurality of semantic objects;

generating a first graphical representation of the identified plurality of semantic objects based on the probability of occurrence of the policy violation;

causing display of the first graphical representation of the identified plurality of semantic objects that cause the policy violation in an arrangement indicative of the relationship between at least the first semantic object and the second semantic object of the identified plurality of semantic objects;

identifying a semantic object as an origin of the policy violation in the plurality of semantic objects in the first graphical representation, the semantic object comprising a set of one or more workflows;

identifying at least one workflow from the set of one or more workflows related to the semantic object that cause the policy violation;

causing the display of the identified one or more workflows related to the policy violation in a display interface of the first graphical representation; and causing the identified one or more workflows to be processed in accordance with an order of the arrangement of the identified plurality of semantic objects.

2. The computer-implemented method of claim 1, wherein the arrangement includes a graph comprising a plurality of nodes and one or more edges connecting at least a subset of the nodes, each of the plurality of nodes corresponding to at least one of the identified plurality of semantic objects, and the subset of the nodes including nodes corresponding to different semantic object types.

3. The computer-implemented method of claim 2, wherein at least one of the one or more edges between a particular pair of nodes corresponding to different semantic object types is unidirectional and indicates a direction between the particular pair, the direction indicating a characteristic of a relationship between the identified plurality of semantic objects corresponding to the particular pair.

4. The computer-implemented method of claim 1, further comprising assigning attributes to one or more of the identified plurality of semantic objects, and wherein one or more of the graphical representations have one or more visual characteristics corresponding to one or more of the assigned attributes.

5. The computer-implemented method of claim 1, further comprising:

receiving a selection of at least one of the identified plurality of semantic objects in the first graphical representation that cause the policy violation; and causing a display of a second graphical representation, the second graphical representation indicative of one or more second relationships between the selected semantic object and one or more pairs of semantic objects.

6. A non-transitory computer-readable storage medium having stored thereon instructions that cause one or more processors to display information, the instructions comprising:

instructions that cause the one or more processors to identify, based at least in part on data stored in a data store, a policy violation;

instructions that cause the one or more processors to identify a plurality of semantic objects that cause the policy violation, the identified plurality of semantic objects including semantic objects of different semantic object types, the identified plurality of semantic objects representing data related to a business policy in an organization;

instructions that cause the one or more processors to compute a probability of occurrence of the policy violation in each semantic object of the identified plurality of semantic objects, the probability of occurrence of the policy violation comprising data that represents a relationship between a first state of a first semantic object of the identified plurality of semantic objects and a second state of a second semantic object of the identified plurality of semantic objects;

instructions that cause the one or more processors to generate a first graphical representation of the identified plurality of semantic objects based on the probability of occurrence of the policy violation;

instructions that cause the one or more processors to cause display of the first graphical representation of the identified plurality of semantic objects that cause the policy violation in an arrangement indicative of the relationship between at least the first semantic object and the second semantic object of the identified plurality of semantic objects;

instructions that cause the one or more processors to identify a semantic object as an origin of the policy violation in the plurality of semantic objects in the first graphical representation, the semantic object comprising a set of one or more workflows;

instructions that cause the one or more processors to identify at least one workflow from the set of one or more workflows related to the semantic object that cause the policy violation;

instructions that cause the one or more processors to cause a display of the identified one or more workflows related to the policy violation in a display interface of the first graphical representation; and instructions that cause the one or more processors to cause the identified one or more workflows to be processed in accordance with an order of the arrangement of the identified plurality of semantic objects.

7. The computer-readable storage medium of claim 6, wherein the arrangement includes a graph comprising a plurality of nodes and one or more edges connecting at least a subset of the nodes, each of the plurality of nodes corresponding to at least one of the identified plurality of semantic objects, and the subset of the nodes including nodes corresponding to different semantic object types.

8. The computer-readable storage medium of claim 7, wherein at least one of the one or more edges between a particular pair of nodes corresponding to different semantic object types is unidirectional and indicates a direction between the particular pair, the direction indicating a characteristic of a relationship between the identified plurality of semantic objects corresponding to the particular pair.

9. The computer-readable storage medium of claim 6, further comprising instructions that cause the one or more processors to assign attributes to one or more of the identified plurality of semantic objects, and wherein one or more of the graphical representations have one or more visual characteristics corresponding to one or more of the assigned attributes.

10. The computer-readable storage medium of claim further comprising:
instructions that cause the one or more processors to receive a selection of at least one of the identified plurality of semantic objects in the first graphical representation that cause the policy violation; and
instructions that cause the one or more processors to cause display of a second graphical representation, the second graphical representation indicative of one or more second relationships between the selected semantic object and one or more pairs of semantic objects.

11. The computer-readable storage medium of claim 6, wherein at least a portion of the arrangement represents a Baysian network.

12. A system for causing display of information, comprising:
at least one data store for storing data;
one or more processors that, when operating in accordance with executable instructions of a computer-readable medium, are at least operable to:
determine, based at least in part on the data, a policy violation;
identify a plurality of semantic objects that cause the policy violation, the identified plurality of semantic objects including semantic objects of different semantic object types, the identified plurality of semantic objects representing data related to a business policy in an organization;
compute a probability of occurrence of the policy violation in each semantic object of the identified plurality of semantic objects, the probability of occurrence of the policy violation comprising data that represents a relationship between a first state of a first semantic object of the identified plurality of semantic objects and a second state of a second semantic object of the identified plurality of semantic objects;
generate a first graphical representation of the identified plurality of semantic objects based on the probability of occurrence of the policy violation;
cause display of the first graphical representation of the identified plurality of semantic objects that cause the policy violation in an arrangement indicative of the relationship between at least the first semantic object and the second semantic object of the identified plurality of semantic objects;
identify a semantic object as an origin of the policy violation in the plurality of semantic objects in the first graphical representation, the semantic object comprising a set of one or more workflows;
identify at least one workflow from the set of one or more workflows related to the semantic object that cause the policy violation;
cause the display of the identified one or more workflows related to the policy violation in a display interface of the first graphical representation; and
cause the identified one or more workflows to be processed in accordance with an order of the arrangement of the identified plurality of semantic objects.

13. The system of claim 12, wherein the arrangement includes a graph comprising a plurality of nodes and one or more edges connecting at least a subset of the nodes, each of the plurality of nodes corresponding to at least one of the identified plurality of semantic objects, and the subset of the nodes including nodes corresponding to different semantic object types.

14. The system of claim 13, wherein at least one of the one or more edges between a particular pair of nodes corresponding to different semantic object types is unidirectional and indicates a direction between the particular pair, the direction indicating a characteristic of a relationship between the identified plurality of semantic objects corresponding to the particular pair.

15. The system of claim 12, wherein the one or more processors are further operable to cause the one or more processors to assign attributes to one or more of the identified plurality of semantic objects, and wherein one or more of the graphical representations have one or more visual characteristics corresponding to one or more of the assigned attributes.

16. The system of claim 12, wherein the one or more processors are further operable to:
receive a selection of at least one of the identified plurality of semantic objects in the first graphical representation that cause the policy violation; and
cause a display of a second graphical representation, the second graphical representation indicative of one or more second relationships between the selected semantic object and one or more pairs of semantic objects.

17. The system of claim 12, wherein at least a portion of the arrangement represents a Baysian network.

* * * * *